Aug. 11, 1931.  G. L. HAMMON  1,818,949
MIXER FOR WELDING TORCHES
Filed April 6, 1929
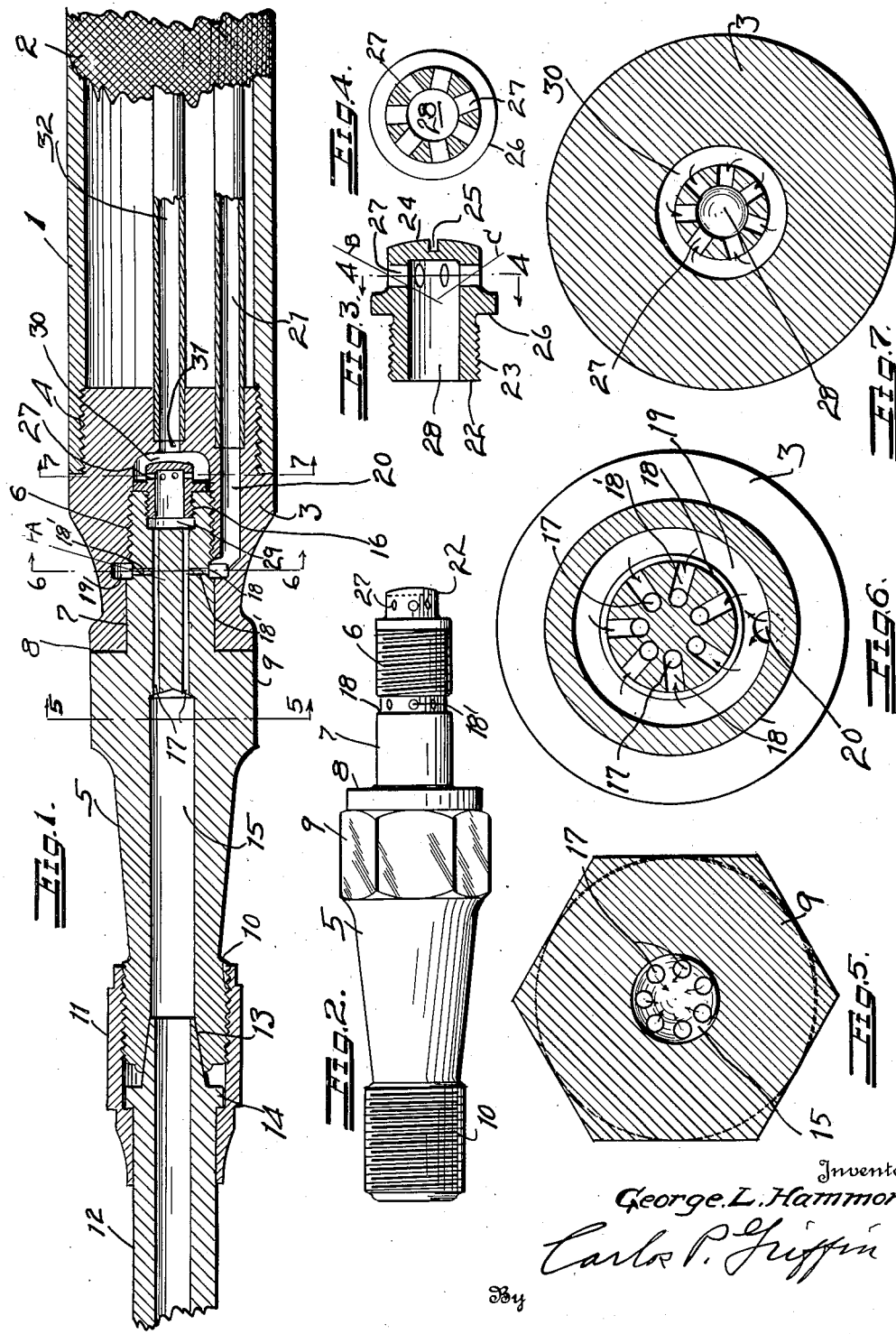
Inventor
George L. Hammon
By Carlos P. Griffin
Attorney Patented Aug. 11, 1931

1,818,949

UNITED STATES PATENT OFFICE

GEORGE L. HAMMON, OF SAN FRANCISCO, CALIFORNIA, ASSIGNOR TO NATIONAL WELDING EQUIPMENT CO., LTD., OF SAN FRANCISCO, CALIFORNIA, A CORPORATION OF CALIFORNIA

MIXER FOR WELDING TORCHES

Application filed April 6, 1929. Serial No. 353,045.

This invention relates to improvements in mixers for welding torches of the class using oxy-acetylene or oxy-hydrogen gases, and the principal object of the invention is to provide means for more thoroughly mingling the gases to form the proper mixture for the most effective operation of the torch.

Another object is to provide means to prevent the striking back, or back fire common to this type of torch.

Another object is to provide means in the end of the mixer adapted to close direct communication with the gas ports.

Another object is the provision of means for dividing equal parts of oxygen and acetylene into multiple parts of each gas, and then mixing in separate multiple chambers before finally being released into a common chamber where they receive a final mixing before advancing to the tip orifice.

Another object is to provide a plurality of longitudinal holes through the mixer, and a plurality of lateral holes meeting the longitudinal holes and forming a connection with the acetylene gas chamber, and another series of lateral holes forming a connection with the oxygen chamber.

Other objects of the invention will be apparent as the description proceeds.

An embodiment of the invention is shown in the accompanying drawings in which the same reference numeral is applied to the same portion throughout, but it is to be understood that it is not limited to this form because it may be embodied in other forms. It is also to be understood that in and by the claims following the description it is desired to cover the invention in whatsoever form it may be embodied.

Figure 1 is a sectional view of the complete mixer showing how it is connected to the handle and to the pipe leading to the tip, Figure 2 is a detached view of the mixer, Figure 3 is an enlarged section of the cap, Figure 4 is a section on line 4—4 of Figure 3, Figure 5 is an enlarged section on the line 5—5 of Figure 1, Figure 6 is an enlarged section on the line 6—6 of Figure 1, and Figure 7 is an enlarged section on the line 7—7 of Figure 1.

The numeral 1 indicates a portion of the handle which is generally knurled as shown at 2 over its surface. The handle has a butt member provided with two openings and two valves not shown. 3 shows the supply member to which the handle is screwed by the threads 4.

The mixer is indicated by the numeral 5. It consists of the threaded end 6, the shank 7, the shoulder 8, the hexagon portion 9, and the threaded end 10, for the union 11 which couples on the elbow pipe 12 only a portion of which is shown—the taper 13. The shoulder 14 is formed by upsetting the end of the pipe 12.

The mixer has the central opening 15 and the threaded opening 16. A plurality of bores 17 join these two openings, any practical number of these bores may be used, in this instance seven are shown. At the inner end of the threads a groove 18 is formed and spaced around the groove are seven small bypasses 18', each drilled to meet one of the longitudinal bores 17.

In the mixer end member an annular groove 19 is provided which aligns with the groove 18 when in place. Connected to the groove 19 is the port 20 into which the acetylene gas supply pipe 21 is soldered.

The cap 22 has a threaded portion 23 which screws into the threads 16. The cap has the closed end 24 and screw driver slot 25 and is adapted to be screwed down onto a shoulder 26. A plurality of small spaced holes 27 are drilled from the outside to the opening 28 in the cap. These holes may be drilled at any angle as indicated at B and C. Also the holes 18' may be drilled at an angle shown by the line A.

The interior of the cap forms the distributing chamber 29.

In the member 3 is a manifold chamber 30 which communicates with the small holes 27, and the port 31 into which the oxygen supply pipe 32 is soldered.

In operation the oxygen is turned into the pipe 32, and the acetylene is turned into the pipe 21.

The oxygen flows through the chamber 30 and into the small holes 27 to the bores 17. The acetylene flows through the port 20 around the grooves 18 and 19 and into the bypasses 18' thence to the boxes 17 where it mixes with the oxygen. This mixture is carried into the opening 15 where it is finally mixed before being carried to the burner tip.

The closed end 24 of the cap 22 cuts off any direct communication with the oxygen and thus prevents back fire, and flashbacks.

Having thus described my invention, what I desire to secure by Letters Patent of the United States is as follows, but modifications may be made in carrying out the invention as shown in the drawings and in the above particularly described form thereof, within the purview of the annexed claims:

1. A mixer for welding torches comprising a body member having distributing and mixing chambers therein connected by a series of longitudinal bores with bypasses leading therefrom intermediate said chambers; a hollow cap in the end of said distributing chamber having radial perforations; a supply tube connecting with said distributing chamber and a supply tube connecting with said bypasses.

2. A mixer for welding torches comprising a body member having distributing and mixing chambers therein connected by a series of longitudinal bores arranged in a circle and having bypasses leading therefrom intermediate said chambers; a perforated cap in the end of said distributing chamber; a supply member enclosing a portion of said body member and having an internal groove registering with said bypasses; a supply tube connected with said groove; and supply tubes in said supply member connected with said groove and distributing chambers respectively.

3. A mixer for welding torches comprising a body member having distributing and mixing chambers therein connected by a series of longitudinal parallel bores with bypasses perpendicular to said boxes and leading therefrom intermediate said chambers; a perforated cap in the end of said distributing chamber; a supply member enclosing a portion of said body member and having an internal groove registering with said bypasses and a manifold chamber enclosing said cap; a supply tube connected with said groove; and a supply tube connected with said manifold chamber.

4. A mixer for welding torches comprising a body member having a mixing chamber at one end thereof communicating with a series of longitudinal bores in said body member, said body having a series of bypasses leading radially from said bores, a hollow cap in the other end of said body and forming a distributing chamber communicating with said bores, said cap having radial perforations in the end thereof, a supply tube connecting with the perforations in said cap, and a supply tube connecting with the bypasses in said body.

In testimony whereof I have hereunto set my hand this 30th day of March A. D. 1929.

GEORGE L. HAMMON.